(12) United States Patent
Ureche et al.

(10) Patent No.: US 8,509,449 B2
(45) Date of Patent: *Aug. 13, 2013

(54) KEY PROTECTOR FOR A STORAGE VOLUME USING MULTIPLE KEYS

(75) Inventors: Octavian T. Ureche, Renton, WA (US); Gaurav Sinha, Hyderabad (IN); Nils Dussart, Kenmore, WA (US); Yi Liu, Sammamish, WA (US); Vijay G. Bharadwaj, Redmond, WA (US); Niels T. Ferguson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

This patent is subject to a terminal disclaimer.

(21) Appl. No.: 12/509,255

(22) Filed: Jul. 24, 2009

(65) Prior Publication Data

US 2011/0022856 A1 Jan. 27, 2011

(51) Int. Cl.
*H04L 9/16* (2006.01)
*H04L 9/08* (2006.01)
*H04L 9/34* (2006.01)

(52) U.S. Cl.
CPC ......... H04L 9/0822 (2013.01); *H04L 2463/062* (2013.01)
USPC ............................ 380/284; 380/285; 380/281

(58) Field of Classification Search
None
See application file for complete search history.

(56) References Cited

U.S. PATENT DOCUMENTS

| | | | |
|---|---|---|---|
| 5,224,166 A * | 6/1993 | Hartman, Jr. ................. | 713/190 |
| 6,550,011 B1 | 4/2003 | Sims, III | |
| 6,813,709 B1 | 11/2004 | Benardeau | |
| 7,506,380 B2 | 3/2009 | Hunter et al. | |
| 7,900,060 B2 | 3/2011 | Hodzic | |
| 8,005,227 B1 | 8/2011 | Linnell et al. | |
| 8,170,213 B1 | 5/2012 | Harwood et al. | |
| 8,190,921 B1 | 5/2012 | Harwood et al. | |
| 2002/0118838 A1 * | 8/2002 | Belenko et al. ............... | 380/277 |
| 2003/0177378 A1 | 9/2003 | Wittkotter | |
| 2005/0114686 A1 * | 5/2005 | Ball et al. ..................... | 713/193 |
| 2006/0015946 A1 * | 1/2006 | Yagawa ......................... | 726/32 |
| 2006/0130154 A1 | 6/2006 | Lam et al. | |
| 2007/0113104 A1 | 5/2007 | Witt et al. | |
| 2007/0136606 A1 | 6/2007 | Mizuno | |
| 2008/0052328 A1 | 2/2008 | Widhelm et al. | |
| 2008/0052537 A1 * | 2/2008 | Nishizono ..................... | 713/193 |
| 2008/0065881 A1 | 3/2008 | Dawson et al. | |

(Continued)

OTHER PUBLICATIONS

Recipe for Mobile Data Security:TPm, BitLocker, Windows Vista and Active Directory. Olzak, Tom. Oct. 2007.*

(Continued)

*Primary Examiner* — Venkat Perungavoor
(74) *Attorney, Agent, or Firm* — Merchant & Gould P.C.

(57) ABSTRACT

A key protector for a storage volume is created by generating an intermediate key and protecting, based at least in part on a public/private key pair, the intermediate key. A volume master key for encrypting and decrypting one or more volume encryption keys that are used to encrypt the storage volume can be encrypted in different manners, including being encrypted based at least in part on the intermediate key. A key protector for the storage volume is stored that includes both the encrypted volume master key and information indicating how to obtain the intermediate key. Subsequently, the key protector can be accessed and, based at least in part on a private key of the entity associated with the key protector, the intermediate key can be decrypted. The intermediate key can then be used to decrypt the volume master key.

18 Claims, 5 Drawing Sheets

(56) References Cited

U.S. PATENT DOCUMENTS

| | | | |
|---|---|---|---|
| 2008/0133905 | A1 | 6/2008 | Challener et al. |
| 2008/0263363 | A1 | 10/2008 | Jueneman et al. |
| 2008/0273696 | A1 | 11/2008 | Greco et al. |
| 2008/0273697 | A1 | 11/2008 | Greco et al. |
| 2008/0294914 | A1 | 11/2008 | Lee et al. |
| 2009/0067633 | A1 | 3/2009 | Dawson et al. |
| 2009/0070598 | A1 | 3/2009 | Cromer et al. |
| 2009/0257597 | A1 | 10/2009 | Bromley et al. |
| 2009/0307499 | A1* | 12/2009 | Senda ............................ 713/187 |
| 2010/0086134 | A1 | 4/2010 | Ureche et al. |
| 2010/0169640 | A1 | 7/2010 | Smith et al. |
| 2010/0299539 | A1 | 11/2010 | Haines et al. |
| 2011/0022856 | A1 | 1/2011 | Ureche et al. |
| 2011/0246785 | A1 | 10/2011 | Linsley et al. |

OTHER PUBLICATIONS

"Advances in BitLocker Drive Encryption", Retrieved at <<http://technet.microsoft.com/en-us/magazine/cc510321.aspx>>, May 18, 2009, pp. 1-4.

"Win32_EncryptableVolume Class", Retrieved at <<http://msdn.microsoft.com/en-us/library/aa376483(VS.85).aspx>>, May 18, 2009, pp. 1-9.

"BitLocker Protecting Data in Windows 7 and Windows Server 2008 R2", Retrieved at <<download.microsoft.com/download/5/E/6/5E66B27B-988B-4F50-AF3A-C2FF1E62180F/ENT-T561_WH08.pptx>>, pp. 30.

"HP ProtectTools Client Security Manageability for Enterprise Customers with Managed IT", Retrieved at <<http://h20331.www2.hp.com/Hpsub/downloads/FINAL_Enterprise%20WP-Security%20Manageability_4AA0-8657ENW.pdf>>, May 2008, pp. 25.

"BitLocker Protecting Data in Windows 7 and Windows Server 2008 R2", Retrieved from: download.microsoft.com/download/5/E/6/5E66B27B-988B-4F50-AF3A-C2FF1E62180F/ENT-T561_WH08.pptx., (2008),30 Pages.

"IBM System Storage DS8000", *IBM*, Available at <http://publib.boulder.ibm.com/infocenter/dsichelp/ds8000ic/topic/com.ibm.storage.ssic.help.doc/f2c_icoverview_36ljk2.pdf>,(Mar. 2009),156 pages.

"Introduction to BitLocker FVE", *Microsoft Services*, Available at <http://cryptome.org/isp-spy/win7-bit-spy.pdf>,(2007),107 pages.

"Microsoft Windows Vista Ultimate 64-bit OEM", Retrieved from: <http://www.advantionline.com/Microsoft-Windows-Vista-Ultimate-64-bit-OEM.html> on Mar. 16, 2010, 10 pages.

"Rocky Mountain RAM Responses to DOD Technical and Functional Requirements Related to McAfee® (formerly SafeBoot®) Mobile Data Security Products", Retrieved from: <http://www.rmram.com/govtsales/DOD/techinfo.htm> on Mar. 16, 2010 (2008),9 pages.

"Windows Vista Ultimate", Retrieved from: <http://www.creationengine.com/html/p.lasso?p=14967> on Mar. 16, 2010, 4 pages.

Corio, Chris "An Introduction to Security in Windows", Retrieved from: <http://www.devx.com/MS_TechNet/Article/41761> on Mar. 16, 2010, (May 2009),5 pages.

Phillips, Josh "BitLocker Team Chat", Retrieved from: <http://windowsconnected.com/forums/p/814/2860.aspx> on Mar. 16, 2010, (Apr. 28, 2006),16 pages.

"Crypted Disks with Remote Key Placed on http Server", Retrieved from: <http://linux.xvx.cz/2009/06/crypted-disks-with-remote-key-placed-on-http-server/> on May 5, 2010, Petr's blog about Linux,(Jun. 7, 2009),3 pages.

Bitlocker Drive Encryption Overview, Jul. 17, 2009, pp. 1-16.

Non-final Office Action for U.S. Appl. No. 12/793,455 mailed on May 31, 2012.

US Amendment filed Aug. 31, 2012, in U.S. Appl. No. 12/793,455 (11 pages).

US Notice of Allowance mailed Sep. 24, 2012, in U.S. Appl. No. 12/793,455 (7 pages).

US Notice of Allowance mailed Dec. 13, 2012, in U.S. Appl. No. 12/793,455 (5 pages).

* cited by examiner

KEY PROTECTOR FOR A STORAGE VOLUME USING MULTIPLE KEYS

BACKGROUND

As computer storage technology has advanced, high capacity portable storage devices have become increasingly commonplace. While these storage devices can store a large amount of information, their portable nature and frequently small size allows them to be easily lost or stolen. Accordingly, security mechanisms are being developed that protect the data stored on portable devices. However, such security mechanisms typically involve additional steps or actions that need to be taken by the user in order for the protection to be applied. Such additional steps or actions can result in user frustration, as well as users simply not protecting their portable devices in order to avoid the additional steps or actions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a key protector for a storage volume is created by generating an intermediate key and protecting, based at least in part on a public/private key pair of an entity, the intermediate key. A volume master key for encrypting and decrypting one or more volume encryption keys that are used to encrypt the storage volume can be encrypted in different manners, including being encrypted based at least in part on the intermediate key. A key protector for the storage volume is stored, the key protector being associated with the entity and including both the encrypted volume master key and information indicating how to obtain the intermediate key.

In accordance with one or more aspects, accessing an encrypted storage volume includes obtaining a private key of an entity associated with a key protector stored on the encrypted storage volume. An intermediate key is also obtained based at least in part on the private key. The intermediate key is used to decrypt a volume master key from the key protector for decrypting one or more volume encryption keys that are used to decrypt the storage volume.

BRIEF DESCRIPTION OF THE DRAWINGS

The same numbers are used throughout the drawings to reference like features.

DETAILED DESCRIPTION

Key protectors based on public keys are discussed herein. One or more key protectors are stored on a storage volume and allow a user or group of users to access encrypted data on the storage volume. One type of key protector is a key protector based on a public key. A key protector based on a public key stores an intermediate key (or information used to obtain an intermediate key) that is encrypted based on a public key of a public/private key pair of a user or group of users that are allowed to access the encrypted data. When access to encrypted data on the storage volume is desired by a user, a private key of the public/private key pair of an entity associated with the key protector is obtained. This private key is used to decrypt a volume master key for the storage volume, which in turn is used to decrypt one or more other keys that allow the encrypted data stored on the encrypted storage volume to be decrypted.

Figure 1:
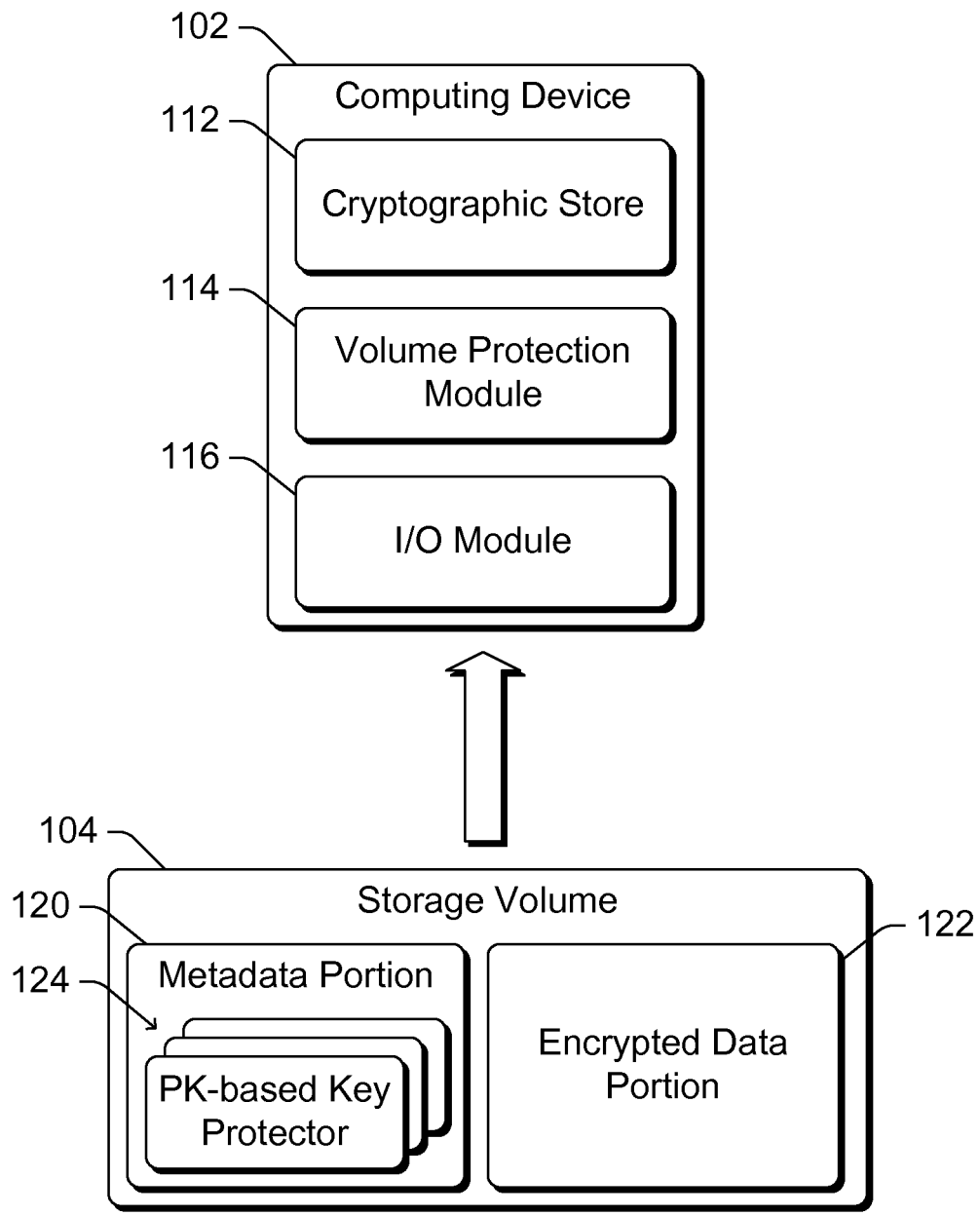
FIG. 1 illustrates an example system implementing the key protectors based on public keys in accordance with one or more embodiments.

FIG. 1 illustrates an example system 100 implementing the key protectors based on public keys in accordance with one or more embodiments. System 100 includes a computing device 102 that can be coupled to a storage volume 104. Storage volume 104 can be a storage device implemented using a variety of different technologies, such as a flash memory device, a magnetic disk, an optical disc, combinations thereof, and so forth. Storage volume 104 can also be a portion of a storage device that is treated by computing devices and operating systems logically as a storage device. For example, a storage volume can be a partition of a hard drive, a portion of a flash memory device, and so forth.

Storage volume 104 can be coupled to device 102 in a variety of different wired and/or wireless manners. For example, volume 104 can be coupled to device 102 via a Universal Serial Bus (USB) connection, a wireless USB connection, an IEEE 1394 connection, a Bluetooth connection, and so forth. Storage volume 104 is designed to be coupled to different computing devices (concurrently or at different times). In one or more embodiments, storage volume 104 is a removable volume, such as being part of a storage device designed to be easily coupled to and decoupled from computing device 102 and transported to other computing devices. An example of such a removable storage volume is a thumb drive or USB flash memory device. Alternatively, storage volume 104 can take other forms, such as being a network storage device that is coupled to computing device 102 via a network (e.g., the Internet, a local area network (LAN), a public telephone network, an intranet, other public and/or proprietary networks, combinations thereof, and so forth).

Computing device 102 can be a variety of different types of devices capable of communication with storage volume 104. For example, computing device 102 can be a desktop computer, a mobile station, a netbook or laptop computer, an entertainment appliance, a set-top box communicatively coupled to a display device, a cellular or other wireless phone, a music or video playback device, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

To protect the data stored on storage volume 104, storage volume 104 is encrypted using a volume-based or drive-based encryption technique. In a volume-based or drive-based encryption technique, entire volumes and/or drives are encrypted rather than individual files stored on those volumes and/or drives. In one or more embodiments, the encryption technique employed for encrypting and decrypting storage volume 104 is the BitLocker™ drive encryption technique available from Microsoft Corporation of Redmond, Wash. Alternatively, other public and/or proprietary encryption techniques can be employed.

References are made herein to symmetric key encryption, public key cryptography and public/private key pairs. Although such key cryptography and encryption is well-known to those skilled in the art, a brief overview of such is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key encryption, on the other hand, a shared key (also referred to as a symmetric key) is known by and kept secret by one or more entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key.

Computing device 102 includes a cryptographic store 112, a volume protection module 114, and an input/output (I/O) module 116. It is to be appreciated that computing device 102 can also include one or more additional components or modules for providing various functionality of computing device 102. Modules 114 and 116 can be implemented in software, firmware, hardware, or combinations thereof. When implemented in software or firmware, each of modules 114 and 116 includes one or more instructions that are executed by a processor or controller of computing device 102. Modules 114 and 116 are typically implemented as part of an operating system of computing device 102, although modules 114 and 116 can alternatively be implemented separate from the operating system. For example, rather than being included as part of an operating system of computing device 102, volume protection module 114 can be obtained from another source (such as a remote device, storage volume 104, and so forth) and run by computing device 102 in order to access the encrypted data on storage volume 104.

Cryptographic store 112 stores keys and/or other information supporting encryption and decryption performed by volume protection module 114. For example, cryptographic store 112 can store one or more of public keys of public/private key pairs, private keys of public/private key pairs, certificates, and/or other data used for encrypting and/or decrypting data. Cryptographic store 112 can be maintained in a variety of different computer storage media of device 102, such as random access memory (RAM), flash memory, a magnetic disk, and so forth. Cryptographic store 112 can also optionally include an interface portion allowing other components and modules of computing device 102 to access data stored by cryptographic store 112. Such an interface portion of store 112 can be implemented in software, firmware, hardware, or combinations thereof.

I/O module 116 manages the input of data from storage volume 104 and the output of data to storage volume 104. I/O module 116 can communicate with storage volume 104 using a variety of different connection and/or networking protocols dependent on the manner in which storage volume 104 is configured to communicate with computing device 102.

Volume protection module 114 supports the particular encryption technique used to protect storage volume 104. Accordingly, when storage volume 104 is coupled to computing device 102, computing device 102 is able to access the encrypted data on storage volume 104 using a key protector as discussed in more detail below.

Storage volume 104 includes a metadata portion 120 and an encrypted data portion 122. Encrypted data portion 122 stores data files that have been encrypted (individually or otherwise) and various other data regarding the protection of storage volume 104, such as locations of various data structures or other information on volume 104, digital signatures over one or more portions of volume 104, and so forth. Metadata portion 120 stores various information regarding storage volume 104 and/or encrypted data portion 122, such as one or more key protectors based on public keys (public key (PK)-based key protectors) 124, a metadata validation field, and so forth.

Each key protector 124 is a structure that stores one or more encrypted keys that allow portion 122 to be decrypted. As storage volume 104 is encrypted using a volume-based or drive-based encryption technique, the one or more encrypted keys in a key protector 124 allow the numerous encrypted data files and other data in portion 122 to be accessed (rather than permitting access to only a single encrypted file). Multiple key protectors 124 can be included on storage volume 104 and can be stored using a variety of different data structures. Key protectors 124 are based on a public key of a public/private key pair as discussed in more detail below. Additionally, one or more other key protectors that store encrypted keys based on other encryption techniques, such as TPM (Trusted Platform Module)-based techniques, can be stored on storage volume 104 in metadata portion 120.

Data in encrypted portion 122 is protected using a set of multiple keys. In one or more embodiments, data in portion 122 is encrypted using a symmetric key referred to as a volume encryption key. A variety of different symmetric key cryptography algorithms or ciphers can be used to encrypt the data using the volume encryption key, such as AES, AES-CCM, DES, RC4, and so forth.

The volume encryption key is encrypted using a different symmetric key referred to as a volume master key. A variety of different symmetric key cryptography algorithms or ciphers can be used to encrypt the volume encryption key using the volume master key, such as AES, AES-CCM, DES, RC4, and so forth. The same algorithm or cipher can be used to encrypt the volume encryption key as is used to encrypt the data in portion 122, or alternatively different algorithms or ciphers can be used. The encrypted volume encryption key is stored on storage volume 104, such as in portion 122 or alternatively elsewhere on volume 104.

Additionally, the volume master key is encrypted using another symmetric key referred to as an intermediate key. A variety of different symmetric key cryptography algorithms or ciphers can be used to encrypt the volume master key using the intermediate key, such as AES, AES-CCM, DES, RC4, and so forth. The same algorithm or cipher can be used to encrypt the volume master key as is used to encrypt the volume encryption key and/or used to encrypt the data in portion 122, or alternatively different algorithms or ciphers can be used. The encrypted volume master key is stored in a key protector 124.

The intermediate key is also encrypted and stored in a key protector based on a public key of an entity associated with the key protector. Alternatively, rather than being encrypted and stored in the key protector, the intermediate key can be protected in other manners and information indicating how to obtain or derive the intermediate key can be stored in the key protector. Multiple such key protectors based on a public key can be associated with the same or different entities, allowing different entities to access the data in portion 122 and/or to allow an entity to identify itself in different manners. By encrypting the volume master key with the intermediate key, the same volume master key can be used with these multiple key protectors.

Figure 2:
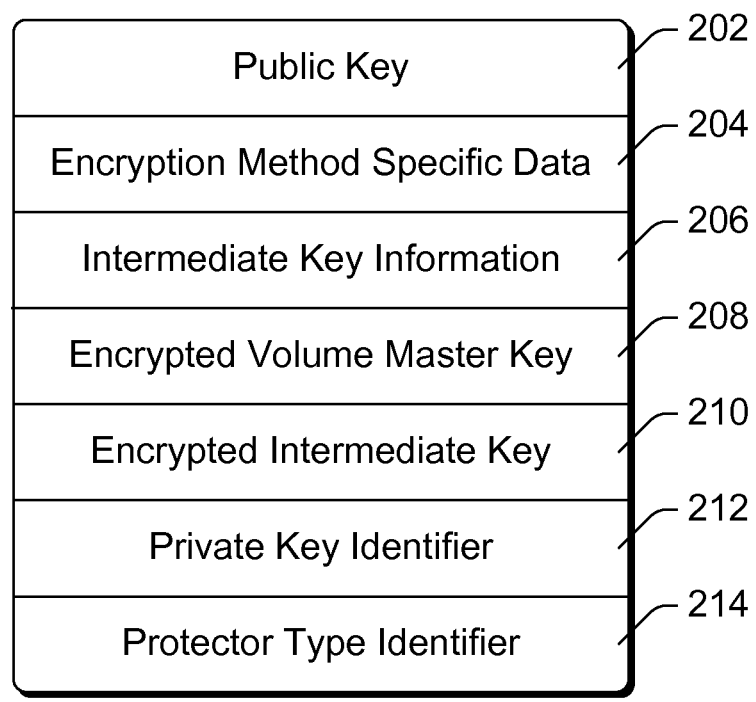
FIG. 2 is a block diagram illustrating an example key protector based on a public key in accordance with one or more embodiments.

FIG. 2 is a block diagram illustrating an example key protector 200 based on a public key in accordance with one or more embodiments. Key protector 200 can be, for example, a key protector 124 of FIG. 1.

Key protector 200 includes a public key portion 202, an encryption method specific data portion 204, an intermediate key information portion 206, an encrypted volume master key portion 208, an encrypted intermediate key portion 210, a private key identifier portion 212, and a protector type identifier portion 214. It is to be appreciated that the portions illustrated in the example of FIG. 2 are examples, and that alternatively one or more of the portions 202-214 need not be included in a key protector, that one or more additional portions can be added to a key protector, and/or that one or more of the portions 202-214 can be combined into a single portion.

Public key portion 202 includes a public key of an entity associated with key protector 200. The entity associated with key protector 200 is the entity that is able to use key protector 200 to decrypt the encrypted data on the storage volume. A variety of different entities can be associated with key protector 200, such as a particular user, a member of a group or collection of users, a particular department or company, and so forth. Whatever the entity is, a public key of the entity is the public key of a public/private key pair of the entity, so the entity has access to the private key corresponding to the public key in portion 202.

Encryption method specific data portion 204 includes data specific to the public key cryptography cipher or algorithm that is used for encrypting the intermediate key. For example, a particular cipher or algorithm could generate a secondary public/private key pair, and the public key of this secondary public/private key pair can be stored in portion 204. If the cipher or algorithm does not use such additional specific data, then key protector 200 need not include portion 204.

The intermediate key information portion 206 includes information that can be used by the entity associated with key protector 200 to obtain the intermediate key. In one or more embodiments, this information is the intermediate key encrypted based on the public key of the entity associated with key protector 200 (which is stored in public key portion 202). A variety of different public key cryptography algorithms or ciphers can be used to encrypt the intermediate key using the public key, such as RSA (Rivest, Shamir, and Adleman), the ElGamal encryption scheme, and so forth.

Alternatively, this information in portion 206 can be other information from which the intermediate key can be derived or otherwise obtained. This other information can optionally be encrypted with the public key of the entity associated with key protector 200. For example, this information in portion 206 can be Key Derivation Function parameters in accordance with the ECDH (Elliptic Curve Diffie-Hellman) key agreement protocol that can be used in deriving the intermediate key. By way of another example, this information in portion 206 can be an indication of a location where the intermediate key (e.g., encrypted or otherwise protected) is stored.

Encrypted volume master key portion 208 includes the volume master key encrypted using the intermediate key. A variety of different symmetric key cryptography algorithms or ciphers can be used to encrypt the volume master key using the intermediate key as discussed above.

The encrypted intermediate key portion 210 includes the intermediate key encrypted based on the volume master key. A variety of different symmetric key cryptography algorithms or ciphers can be used to encrypt the intermediate key using the volume master key, such as AES, AES-CCM, DES, RC4, and so forth. The same algorithm or cipher can be used to encrypt the intermediate key as is used to encrypt other data or keys (e.g., the volume encryption key, the data in portion 122, etc.) or alternatively a different algorithm or cipher can be used.

Private key identifier portion 212 includes information identifying a private key of a public/private key pair of the entity associated with key protector 200. This information can be in a variety of different forms, such as a digital certificate of the entity associated with key protector 200, a public key of the public/private key pair, an indication of a location where the private key is stored, a hash value generated by applying a cryptographic hash function to the private key, and so forth. It should be noted that if the information identifying the private key of the public/private key pair of an entity associated with key protector 200 is a public key of the entity, then one of private key identifier portion 212 and public key portion 202 need not be included in key protector 200.

The information identifying a private key of the entity associated with key protector 200 in private key identifier portion 212 allows the private key to be identified by the entity associated with key protector 200. An entity can have multiple public/private key pairs, and private key identifier portion 212 allows a particular private key (or public/private key pair) to be identified. This identified private key can then be obtained and used as a basis for decrypting the intermediate key in portion 206, and thus lead to decrypting the data encrypted on the storage volume as discussed in more detail below.

The information in private key identifier portion 212 can optionally be a digital certificate that includes the public key of the entity associated with key protector 200 (which is stored in public key portion 202). When an entity generates or obtains a public/private key pair, the public key is oftentimes included in a digital certificate. The digital certificate is digitally signed by a trusted third party, allowing devices that access the digital certificate to verify that the certificate is authentic (assuming the devices trust the trusted third party) and thus that the information included in the digital certificate can be trusted.

When a digital certificate is included in identifier portion 212, the information describing the digital certificate included in identifier portion 212 includes a certificate identifier. This certificate identifier allows digital certificates to be distinguished from one another and allows the digital certificate that includes the public key of the entity associated with key protector 200 to be identified. This certificate identifier can take a variety of different forms, such as a hash value generated by applying a hash function to the digital certificate, an identifier added to the digital certificate when the digital certificate is generated, an identifier added to the digital certificate when the digital certificate is digitally signed by the trusted third party, and so forth.

The information describing the digital certificate included in identifier portion 212 can also include other information. For example, the information can include a user-friendly name that is a description (typically easily understood by humans) of the entity associated with key protector 200.

Protector type identifier portion 214 includes a value that identifies key protector 200 as being a key protector based on a public key. As discussed above, other types of key protectors can be included in the metadata of a storage volume, and the value in identifier portion 214 allows key protector 200 to be identified as a key protector based on a public key rather than a different type of key protector.

Figure 3:
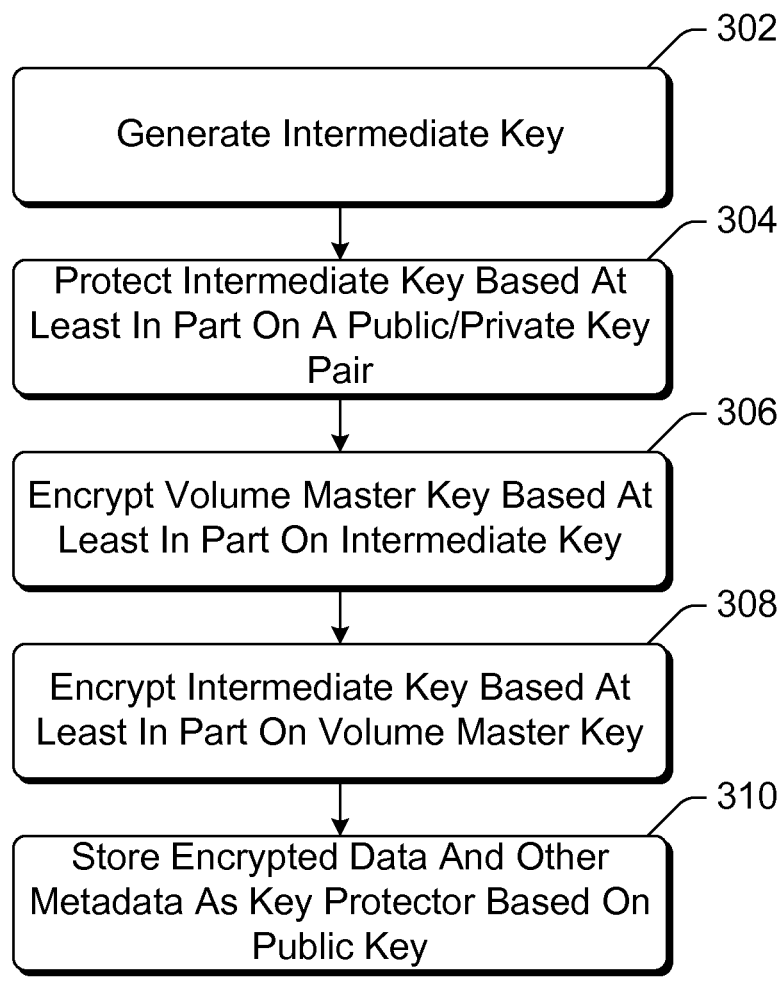
FIG. 3 is a flowchart illustrating an example process for creating a key protector based on a public key in accordance with one or more embodiments.

FIG. 3 is a flowchart illustrating an example process 300 for creating a key protector based on a public key in accordance with one or more embodiments. Process 300 can be carried out by a volume protection module of a computing device, such as module 114 of FIG. 1, or alternatively by another component or module and/or another device. Process 300 can be implemented in software, firmware, hardware, or combinations thereof. Process 300 is shown as a set of acts and is not limited to the order shown for performing the operations of the various acts. Process 300 is an example process for creating a key protector based on a public key; additional discussions of creating a key protector based on a public key are included herein with reference to different figures.

In one or more embodiments, process 300 is performed in response to a user request to encrypt a storage volume. Alternatively, process 300 can be performed at other times, such as before the storage volume is distributed to users, when the storage volume is manufactured or distributed, and so forth.

In process 300, an intermediate key is generated (act 302). The intermediate key can be generated in a variety of different manners. In one or more embodiments, the intermediate key is an AES 256-bit key generated using one of a variety of different conventional random or pseudo-random number generators. Alternatively, the intermediate key can be generated using a key agreement protocol, such as ECDH. The size (number of bits) of the intermediate key can vary based on the symmetric cipher or algorithm using the intermediate key.

The intermediate key is protected based at least in part on a public/private key pair (act 304) of the entity associated with the key protector being created. This entity associated with the key protector being created is typically the entity performing act 300 (or requesting that act 300 be performed), although alternatively can be a different entity.

This protection in act 304 can take a variety of different forms. In one or more embodiments, this protection includes encrypting the intermediate key using the public key of the entity associated with the key protector being created. The encryption can be performed using a variety of different public key cryptography algorithms or ciphers as discussed above. The particular algorithm or cipher that is used can be identified in different manners, such as being identified in a digital certificate of the entity associated with the key protector being created, being inherent in the module or device implementing process 300, and so forth. Different algorithms or ciphers can use different parts of the public/private key pair, such as encrypting using the public key, and so forth.

In other embodiments, rather than encrypting the intermediate key, this protection in act 304 can take other forms. For example, the intermediate key can be stored in a secure location that is accessible to the entity associated with the key protector being created (e.g., with access to the secure location being controlled based on the public/private key pair of the entity). It should also be noted that this protection in act 304 can be inherent in the generation of the intermediate key in act 302. For example, if the intermediate key is generated by performing key agreement between the public key of the entity associated with the key protector being created and a secondary private key, then the intermediate key is inherently protected and a separate act 304 need not be performed.

Additionally, the volume master key is encrypted based at least in part on the intermediate key (act 306). The volume master key is encrypted using one of a variety of different symmetric ciphers or algorithms as discussed above.

The intermediate key is also encrypted based at least in part on the volume master key (act 308). The intermediate key is encrypted using one of a variety of different symmetric ciphers or algorithms as discussed above. The intermediate key can be encrypted using the same symmetric cipher or algorithm as used in act 304 or act 306, or alternatively a different symmetric cipher or algorithm.

The encrypted data generated in acts 306 and 308, as well as other metadata, is stored as a key protector based on a public key (act 310). Additionally, information indicating how to obtain the intermediate key is also stored in the key protector based on a public key in act 310, such as storing the encrypted intermediate key, or storing other information indicating how to derive or otherwise obtain the intermediate key (based on the protection in act 304). Examples of this other information include, for example, an indication of a secure location where the intermediate is stored, a secondary public key in accordance with the ECDH key agreement protocol, and so forth.

The other metadata included in the key protector can be, for example, the public key of the entity for which the key protector is being generated, information identifying a private key of the public/private key pair of the entity for which the key protector is being generated, certificate information, a protector type identifier, and so forth. The key protector in act 310 is, for example, a key protector 200 of FIG. 2. The key protector can be stored on the storage volume itself as part of act 310, or alternatively the key protector can be stored on another device and transferred to the storage volume at a later time.

It should be noted that the process 300 of FIG. 3 assumes that the encryption of the data of the storage volume using the volume encryption key, as well as the encryption of the volume encryption key using the volume master key, is being performed by another component or module and/or has already been performed. The key protector generated by process 300 stores the encrypted volume master key, allowing the key protector to be subsequently used to access the encrypted data on the storage volume. If, however, the storage volume has not already been encrypted, then the data of the storage volume is encrypted using the volume encryption key, and the volume encryption key is encrypted using the volume master key as discussed above.

Figure 4:
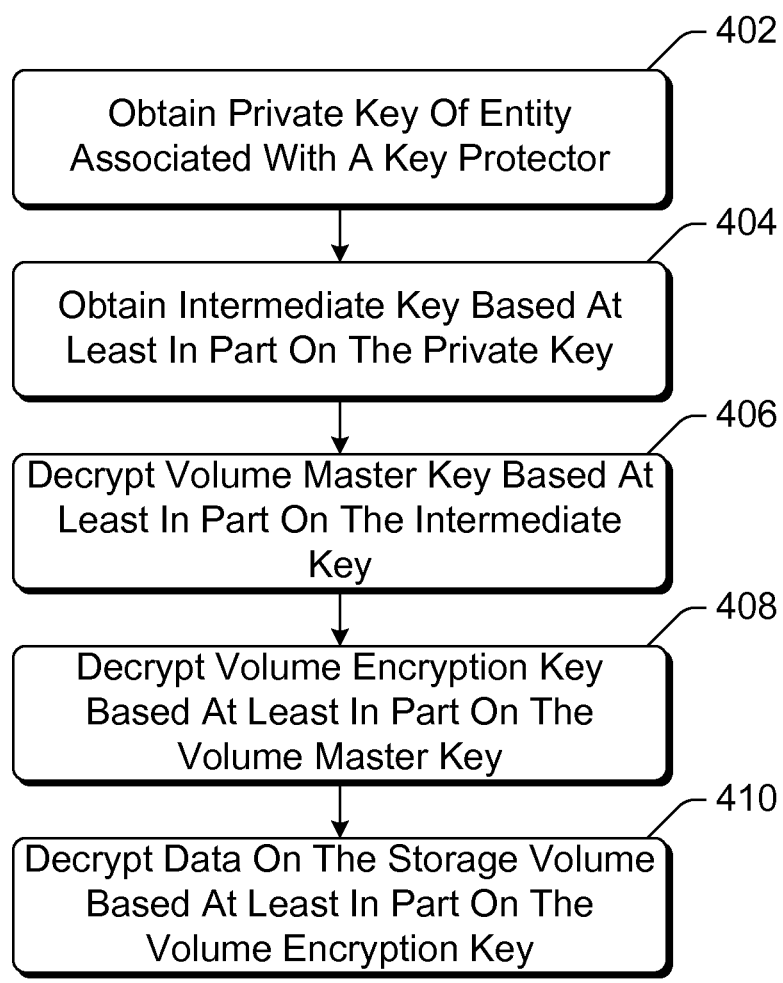
FIG. 4 is a flowchart illustrating an example process for using a key protector based on a public key to decrypt data on a storage volume in accordance with one or more embodiments.

FIG. 4 is a flowchart illustrating an example process 400 for using a key protector based on a public key to decrypt data on a storage volume in accordance with one or more embodiments. Process 400 can be carried out by a volume protection module of a computing device, such as module 114 of FIG. 1, or alternatively by another component or module. Process 400 can be implemented in software, firmware, hardware, or combinations thereof. Process 400 is shown as a set of acts and is not limited to the order shown for performing the operations of the various acts. Process 400 is an example process for using a key protector based on a public key to decrypt data on a storage volume; additional discussions of using a key protector based on a public key to decrypt data on a storage volume are included herein with reference to different figures.

In one or more embodiments, process 400 is performed in response to a request to access an encrypted storage volume. Alternatively, process 400 can be performed at other times, such as when an encrypted storage volume is coupled to the computing device implementing process 400, when a user enters his or her credentials, and so forth.

The private key of an entity associated with a key protector is obtained (act 402). The private key can be obtained from various sources, such as from cryptographic store 112 of FIG. 1 based on the public key included in the key protector, from a smartcard presented by the user, and so forth. The private key is the private key of the public/private key pair of the entity associated with the key protector. In situations where an entity has multiple public/private key pairs and/or multiple key protectors based on public keys are included on the storage volume, the private key of the entity associated with a particular key protector can be identified in different manners. For example, the private key can be identified based on the public key in the key protector (e.g., the private key in the same public/private key pair as the public key in public key portion 202 of FIG. 2) or based on the private key identifier 212 (e.g., in private key identifier portion 212 of FIG. 2).

In one or more embodiments, the private key is obtained as a result of some other action performed by a user of the computing device implementing process 400, such as the user entering his or her credentials when logging into the computing device, user entering his or her credentials when presenting a smartcard to the computing device and so forth. These credentials can take a variety of different forms, such as a username and password, answers to one or more security questions, biometric information (e.g., fingerprint, eye scan, etc.), and so forth. The user enters his or her credentials as part of using the computing device (e.g., logging in, presenting his or her smartcard, etc.), and the key protectors based on public keys leverages this credential entering to allow access to the encrypted data on the storage volume. Thus, existing mechanisms via which public/private key pairs are distributed are also leveraged by the key protectors based on public keys discussed herein. The use of these public/private key pairs to protect data on the storage volume is done transparently, requiring no special user intervention in order for the data on the storage volume to be protected via a key protector based on a public key as discussed herein.

Based on the user credentials that the user enters, the user is authenticated or not authenticated. This authentication is performed by another component or module of the computing device implementing process 400, although alternatively at least part of the authentication can be performed by the module of the computing device implementing process 400. This authentication allows the user to access the computing device implementing process 400, including allowing the user to access cryptographic store 112. Accordingly, once the user is authenticated, a private key of that user can be obtained (e.g., from cryptographic store 112 of FIG. 1). The key protector that identifies that private key can then be readily identified. If the user is not authenticated, then process 400 ends (or does not even begin) and the data on the storage volume is not decrypted.

Alternatively, rather than obtaining the private key and then identifying a key protector that identifies that private key, the key protector can be selected first. Whether the user has credentials allowing access to the private key in the key protector can then be determined in a variety of different manners as discussed above. If the user is authenticated as being allowed to access the private key identified in the key protector, then access to the identified private key is permitted; otherwise process 400 ends (or does not even begin) and the data on the storage volume is not decrypted.

The intermediate key is obtained based at least in part on the private key that was obtained in act 402 (act 404). The manner in which the intermediate key is obtained is dependent on the manner in which the intermediate key was protected (e.g., in act 304 of FIG. 3). For example, if the intermediate key was protected by being encrypted, then a variety of different public key cryptography algorithms or ciphers can be used to decrypt the intermediate key using the private key, and the particular algorithm or cipher used is the decryption algorithm or cipher that corresponds to the encryption algorithm or cipher used to encrypt the intermediate key (e.g., as discussed above with reference to act 304 of FIG. 3). The particular algorithm or cipher that is used can be identified in different manners, such as being identified in a digital certificate of the authenticated user, being inherent in the module or device implementing process 400, and so forth. By way of another example, if the intermediate key is stored in a secure location, then the intermediate key is retrieved from that secure location in act 404.

The volume master key is decrypted based at least in part on the intermediate key (act 406). A variety of different symmetric ciphers or algorithms can be used to decrypt the volume master key using the intermediate key, and the particular algorithm or cipher used is the decryption algorithm or cipher that corresponds to the encryption algorithm or cipher used to encrypt the volume master key (e.g., as discussed above with reference to act 306 of FIG. 3).

The volume encryption key is decrypted based at least in part on the volume master key (act 408). A variety of different symmetric ciphers or algorithms can be used to decrypt the volume encryption key using the volume master key, and the particular algorithm or cipher used is the decryption algorithm or cipher that corresponds to the encryption algorithm or cipher used to encrypt the volume encryption key using the volume master key.

Data on the storage volume can then be decrypted based at least in part on the volume encryption key (act 410). A variety of different symmetric ciphers or algorithms can be used to decrypt the data using the volume encryption key, and the particular algorithm or cipher used is the decryption algorithm or cipher that corresponds to the encryption algorithm or cipher used to encrypt the data using the volume encryption key.

It should be noted that, in some of the discussions above the key protectors based on public keys are discussed as including an identifier of a digital certificate. This allows a particular key protector to be associated with a particular user or entity so that the correct key protector can be identified and used to decrypt the encrypted data portion of the storage volume. Alternatively, different techniques or mechanisms can be used to associate key protectors with users or entities so that the correct key protector can be identified, such as including the user name or entity name (e.g., the user name used to log in to the computing device) in the key protector, including an identifier of the user name or entity name (e.g., a hash of the user name or entity name) in the key protector, and so forth.

It should also be noted that the key protectors based on public keys discussed herein support easily changing or rolling the volume master key. As discussed above, the data on the storage volume is encrypted using a volume encryption key, which in turn is encrypted using the volume master key. To enhance the security of the encryption of the storage device, the volume master key can be changed at various times. The entire storage volume need not be re-encrypted because the volume encryption key is not changed. However, the key protectors based on public keys include the volume master key encrypted using the intermediate key, and this encrypted volume master key is used to access the data based on a key protector as discussed herein.

The key protector also includes the intermediate key encrypted using the volume master key. If the volume master key is changed from one volume master key (referred to as the old volume master key) to a different volume master key (referred to as the new volume master key), then as part of the changing process the old volume master key can be used to decrypt the encrypted intermediate key without requiring the public key and/or private key of the entity associated with the key protector. The intermediate key can then be used to encrypt the new volume master key, and the encrypted new volume master key replaces the encrypted old volume master key in the key protector. The new volume master key is also used to encrypt the intermediate key, and the intermediate key encrypted with the new volume master key replaces the intermediate key encrypted with the old volume master key in the key protector.

It is to be appreciated that the key protectors based on public keys discussed herein support various usage scenarios. Various different key protectors based on public keys can be generated for different reasons, allowing the entities associated with those public keys to access the data on the encrypted storage volume. For example, a user can have a key protector generated based on the public key in his or her digital certificate stored on a smartcard. This key protector is then stored on the encrypted storage volume. When the user presents his or her smartcard to a computing device, the computing device can use the digital certificate on that smartcard to access data encrypted on an encrypted storage volume. The user authenticates himself or herself for use of the smartcard, and once that authentication has been performed the user need not present any other credentials or take any other steps or actions to access the data on the encrypted storage volume.

By way of another example, a data recovery team or individual can have a key protector generated based on the public/private key pair associated with that team or individual. This key protector is then stored on the encrypted storage volume. If the user were to become unable to access the data on his or her encrypted storage volume (e.g., the user loses his or her smartcard, forgets his or her password, and so forth), then the data recovery team or individual can use their public/private key pair to access data on the encrypted storage volume.

By way of yet another example, an encrypted storage volume can be provisioned with a key protector associated with a particular group of individuals. Each member of this group has credentials that identify them as a member of the group. Accordingly, each member of the group can authenticate themselves as being a member of the group, and can use the digital certificate on their smartcards (or alternatively public/private key pairs stored elsewhere), along with the corresponding key protector, to access the data on the encrypted storage volume.

Figure 5:
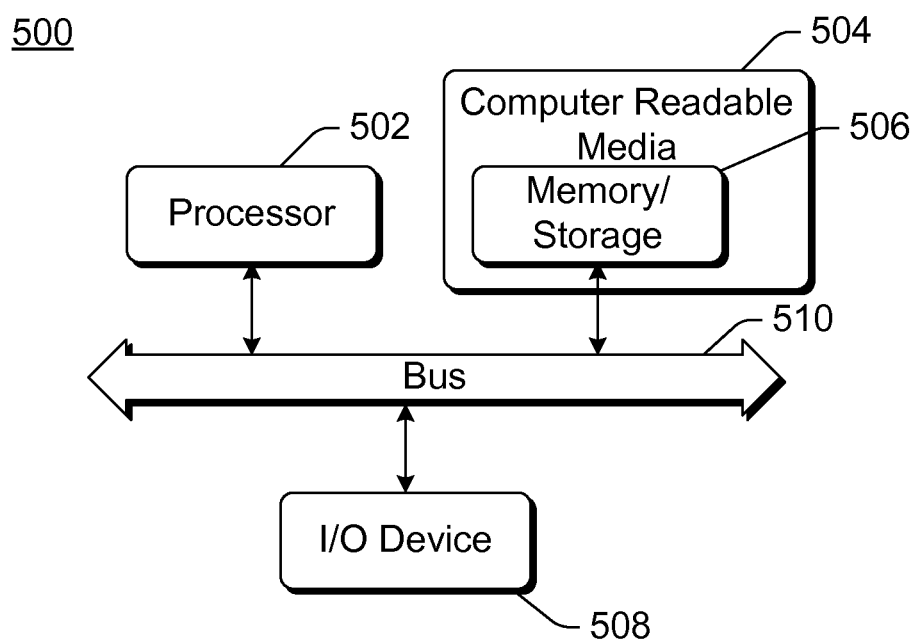
FIG. 5 illustrates an example computing device that can be configured to implement the key protectors based on public keys in accordance with one or more embodiments.

FIG. 5 illustrates an example computing device 500 that can be configured to implement the key protectors based on public keys in accordance with one or more embodiments. Computing device 500 can be, for example, computing device 102 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the key protectors based on public keys techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of creating a key protector for a storage volume, the method comprising:
    generating an intermediate key with a computing device;
    protecting, based at least in part on a public key of a public/private key pair of an entity, the intermediate key for encrypting and decrypting a volume master key;
    encrypting based at least in part on the intermediate key, the volume master key for encrypting and decrypting one or more volume encryption keys that are used to encrypt the storage volume; and
    storing a key protector for the storage volume, the key protector being associated with the entity and including both the encrypted volume master key and the intermediate key.

2. A method as recited in claim 1, further comprising storing the key protector on the storage volume.

3. A method as recited in claim 1, further comprising:
    generating an encrypted intermediate key by encrypting the intermediate key based at least in part on the volume master key, and storing the encrypted intermediate key in the key protector;
    obtaining a new volume master key;
    obtaining the intermediate key by decrypting the encrypted intermediate key using the volume master key;
    generating a new encrypted volume master key by encrypting, based at least in part on the intermediate key, the new volume master key;
    replacing the encrypted volume master key in the key protector with the new encrypted volume master key;
    generating a new encrypted intermediate key by encrypting, based at least in part on the new volume master key, the intermediate key; and
    replacing the encrypted intermediate key in the key protector with the new encrypted intermediate key.

4. A method as recited in claim 1, the storing further comprising storing, in the key protector, both information identifying a private key of the public/private key pair and a protector type identifier that identifies the key protector as being a key protector based on a public key.

5. A method as recited in claim 1, wherein the storage volume comprises a removable flash memory device.

6. A method as recited in claim 1, wherein the entity comprises a user and wherein protecting the intermediate key is based at least in part on a digital certificate of the user obtained when the user is authenticated to the computing device.

7. A method as recited in claim 6, the storing further comprising storing, in the key protector, a certificate identifier that identifies the digital certificate.

8. A method as recited in claim 1, further comprising, in response to receiving a request to access the storage volume:
    obtaining a private key of the entity;
    obtaining, based at least in part on the private key, the intermediate key; and
    using the intermediate key to decrypt the encrypted volume master key for decrypting the one or more volume encryption keys.

9. A method as recited in claim 1, further comprising repeating the generating, the protecting, the encrypting, and the storing for one or more additional key protectors.

10. A method of accessing an encrypted storage volume, the method comprising:
    obtaining a private key of an entity associated with a key protector stored on the encrypted storage volume, the private key being of a public/private key pair;
    obtaining, based at least in part on the private key, an intermediate key for encrypting and decrypting a volume master key; and
    using the intermediate key by a computing device to decrypt the volume master key from the key protector for decrypting one or more volume encryption keys that are used to decrypt the storage volume.

11. A method as recited in claim 10, wherein the key protector includes an encrypted intermediate key, and wherein obtaining the intermediate key comprises decrypting, based at least in part on the private key, the encrypted intermediate key.

12. A method as recited in claim 10, wherein the key protector is stored in an unencrypted portion of the encrypted storage volume.

13. A method as recited in claim 10, wherein the encrypted storage volume comprises a removable flash memory device.

14. A method as recited in claim 10, wherein the key protector includes an encrypted intermediate key that is encrypted based on the volume master key, the method further comprising:
    receiving a new volume master key;
    decrypting, based at least in part on the volume master key, the intermediate key from the key protector;
    generating a new encrypted intermediate key by encrypting, based at least in part on the new volume master key, the intermediate key;
    storing the new encrypted intermediate key in the key protector;
    generating a new encrypted volume master key by encrypting, based at least in part on the intermediate key, the new volume master key; and
    storing the new encrypted volume master key in the key protector.

15. A method as recited in claim 10, the key protector further including both information identifying the private key of the public/private key pair that includes the private key and a protector type identifier that identifies the key protector as being a key protector based on the public key.

16. A method as recited in claim 10, wherein the private key is identified based on a digital certificate, the key protector further including a certificate identifier that identifies the digital certificate.

17. A method as recited in claim 10, the key protector further including a data portion storing a public key of a secondary public/private key pair generated in encrypting the intermediate key.

18. A computer-readable storage device that includes computer-executable instructions, which when executed by a computing device, cause the computing device to:
   generate an intermediate key with a computing device;
   protect, based at least in part on a public key of a public/private key pair of an entity, the intermediate key for encrypting and decrypting a volume master key;
   encrypt based at least in part on the intermediate key, the volume master key for encrypting and decrypting one or more volume encryption keys that are used to encrypt the storage volume; and
   store a key protector for the storage volume, the key protector being associated with the entity and including both the encrypted volume master key and the intermediate key.

* * * * *